L. A. & R. H. BIGGAR.
LUBRICATOR.
APPLICATION FILED DEC. 12, 1914.
1,173,921. Patented Feb. 29, 1916.
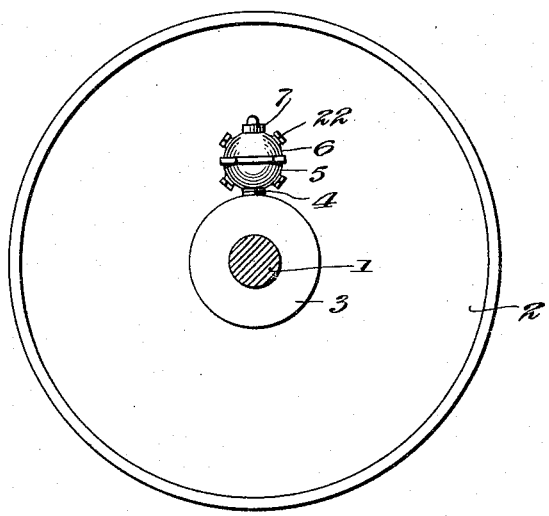
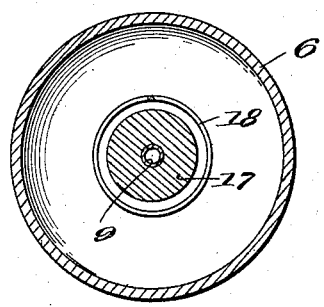
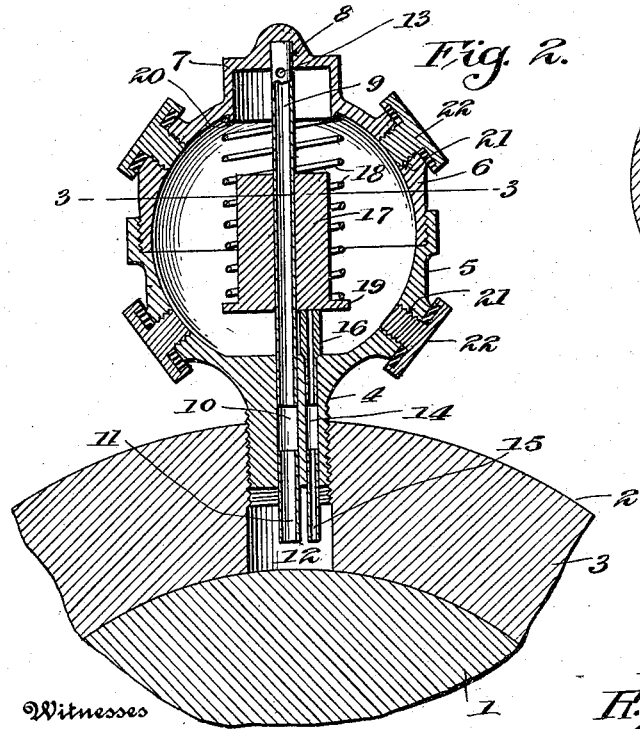
Inventors
L. A. Biggar
R. H. Biggar

UNITED STATES PATENT OFFICE.

LEROY A. BIGGAR AND RUTHERFORD H. BIGGAR, OF ONEIDA, NEW YORK.

LUBRICATOR.

1,173,921.  Specification of Letters Patent.  Patented Feb. 29, 1916.

Application filed December 12, 1914. Serial No. 876,899.

*To all whom it may concern:*

Be it known that we, LEROY A. BIGGAR and RUTHERFORD H. BIGGAR, citizens of the United States, residing at Oneida, in the county of Madison and State of New York, have invented new and useful Improvements in Lubricators, of which the following is a specification.

This invention relates to lubricating devices and more particularly to oil cups for loose pulleys.

One of the principal objects of the invention is to provide a centrifugally controlled lubricating device which is actuated upon each starting of the loose pulley to feed a predetermined quantity of lubricant to the pulley shaft. When feeding lubricant to pulleys of this type it is desirable that at each start of the pulley a predetermined quantity of lubricant be fed to the pulley shaft and then the flow of lubricant stopped so as to avoid waste, and in lubricators of this type it is also necessary that provision be made for filling the cup with the pulley in any position without having to move the pulley.

Another object of the invention is the provision of a cup of this character having means for admitting a sufficient quantity of air to the cup which is accomplished by providing a valve for closing the outlet port when the pulley is inactive. To this end it is the object of this invention to provide a device which upon starting of the pulley will feed a predetermined quantity of oil to the shaft of the pulley and at the same time open an air inlet so as to prevent a vacuum in the cup, also to provide a device in which the air port is closed off immediately upon stopping of the pulley so as to prevent unnecessary escape of oil from the cup and to provide for a free circulation of air within the cup.

Further objects of the invention will appear as the following description is read in connection with the accompanying drawing, which forms a part of this application, and in which:—

Figure 1 is a side elevation of a pulley showing the improved type of cup attached thereto. Fig. 2 is a detail vertical sectional view taken through the cup and pulley hub. Fig. 3 is a horizontal section taken on the line 3—3 of Fig. 2.

Referring more particularly to the drawing, 1 represents an ordinary line or countershaft which has loosely mounted thereon the pulley 2. This pulley is provided with the usual hub 3 having a radial opening for the reception of the cup nipple 4, which opening connects or provides communication between the cup and the shaft and forms a reservoir, the purpose of which will be hereinafter described.

The cup, as shown, is constructed of upper and lower sections 5 and 6, the former of which is provided with a concentric external flange internally threaded to receive the externally threaded lower edge of the upper section. The section 5 is provided with the externally threaded nipple 4 which is threaded into the hub 3, as before described, and the upper section 6 is provided with an extension 7 forming a cylinder, the purpose of which will be hereinafter described. The base of the cylinder is recessed, as shown at 8, to receive the upper terminal of the hollow shaft 9. This shaft is arranged centrally in the cup and has its lower end seated in a channel 10 formed centrally in the nipple 4 and communicating with a feed nipple 11 which passes through the reservoir, indicated at 12, and has its terminal arranged adjacent the shaft 1. The upper end of the shaft 9 is ported, as shown at 13, to permit the oil in the cylinder 7 to pass into the hollow shaft 9.

The nipple 4 is also provided with a channel 14 in which is located the separated vent tubes 15 and 16, the former extending down into the reservoir 12 and terminating on a line even with the end of the tube 1. The latter tube 16 is enlarged at its upper end and extends into the cup a short distance. Slidably mounted upon the shaft 9 is a plunger or piston 17 arranged to normally rest upon the upper end of and close the tube 16. This action is brought about by a light spiral spring 18 which surrounds the piston or plunger 17 and has its inner end resting upon an annular flange 19 and its upper end surrounding a depending annular rib 20 forming an inwardly extending continuation of the cylinder 7.

Each section of the cup is provided with a pair of plug filling openings 21 closed by the plugs 22 and, as will be seen, these openings are arranged at quarter intervals around a substantially globular cup so that irrespective of the position of the pulley the cup may be filled.

In the operation of the device it will be noticed that when the pulley is started that the plunger or pulley 15 moves outwardly over the shaft 9 and freely passes through the oil within the cup until it reaches the cylinder. The oil being forced into the cylinder by centrifugal action is acted upon by the plunger and forced through the opening 13 and channel 10 and through the shaft 9, and tube 11 to the reservoir 12. As the oil in this reservoir is also admitted by centrifugal action it will remain against the end of the nipple 4 until the pulley stops. If the pulley stops with the cup upside down no oil reaches the shaft until the pulley is again started. The slow movement in first starting permits at least three-fourths of a revolution to be made before gaining full speed and this three-fourths revolution is sufficient to enable a certain quantity of the oil in the reservoir 12 to reach the shaft. It will be noticed that in this operation the air channel has been opened by the piston receding from the end of the tube 16, thus admitting the desired quantity of air to the cup to prevent a vacuum, and that immediately upon the pulley stopping the plunger will, by the action of the spring 18, be forced against the end of the tube 16, thus closing the same and preventing unnecessary escape of oil. It will also be noticed that the plunger when fully extended by centrifugal action will close the port 13 and thereby retain the oil in the shaft, also that upon receding the piston opens the port thus allowing air to enter the cup through this channel, thus eliminating a vacuum in the cylinder.

What is claimed is:—

1. A lubricator for pulleys comprising a closed cup, and means operating within the cup and coacting therewith to successively discharge a predetermined portion of oil from the cup at each starting of the pulley and to thereafter remain inactive during the rotation of the pulley.

2. A lubricating device comprising a closed cup, means for connecting the same to a pulley, means forming a communication between the cup and the pulley shaft, and centrifugal means operating at each starting of the pulley to successively discharge predetermined portions of oil from the cup through the communicating means to the pulley shaft, said means remaining inactive thereafter.

3. A lubricating device for loose pulleys comprising a closed cup attached to the pulley, and means acting successively upon each starting of the pulley to discharge a predetermined portion of lubricant from the cup and thereafter remaining inactive during the revolution of the pulley.

4. A lubricator for pulleys comprising a closed cup having a lubricant outlet and an air inlet, and centrifugally controlled means operating within the cup to alternately open the air inlet and discharge lubricant from the cup and close the air inlet.

5. A lubricating device for pulleys comprising a closed cup having a lubricant outlet and an air inlet, and means operating within the cup for successively opening the air inlet and discharging a predetermined quantity of lubricant through the outlet.

6. A lubricating device for pulleys comprising a closed cup having a lubricant outlet, a cylinder having its full diameter open to the cup, and a plunger freely operating in the cup and arranged to force oil from the cylinder to the outlet by centrifugal action.

7. A lubricating device for pulleys comprising a cup having a lubricant outlet and an air inlet, and means automatically actuated upon the starting and stopping of the pulley for opening the air inlet and discharging oil from the cup and for closing the air inlet.

8. A lubricating device for pulleys comprising a closed cup having a lubricant outlet and a plunger cylinder, a reciprocally mounted plunger arranged to successively operate in the cup and cylinder, said plunger being of smaller diameter than the cup and adapted to closely fit the cylinder.

9. In a lubricating device for pulleys, the combination with an apertured hub, of a closed lubricant cup having a portion fitted in the aperture and partially filling the same and forming with the walls of the aperture a reservoir, a lubricant outlet for the cup communicating with the reservoir, means operating upon the starting of the pulley to discharge a predetermined portion of oil from the cup to the reservoir and a venting connection between the reservoir and cup.

10. In a lubricating device for pulleys, a closed cup attached to the hub of the pulley, a hollow shaft extending through the cup and forming a lubricant outlet, an air outlet for the cup, a plunger operating over said shaft and free of the walls of the cup, a cylinder communicating with the hollow shaft and arranged to closely fit the plunger, and a spring acting upon the plunger to normally cause the same to close the air inlet, said plunger being actuated by centrifugal force in the starting of the pulley to express a predetermined quantity of oil from the cylinder through the hollow shaft.

11. A lubricator for pulleys comprising a closed cup, a central tube connecting the cup to a pulley, a cylinder open to the cup and tube, and a plunger of less diameter than the cup and arranged to fit the cylinder, said plunger being slidably mounted upon the tube and arranged to fit the cylinder and discharge a predetermined amount of oil to the pulley, said plunger being centrifugally actuated at each starting of the pulley.

In testimony whereof we affix our signatures in presence of two witnesses.

LEROY A. BIGGAR.
RUTHERFORD H. BIGGAR.

Witnesses:
JOSEPH P. McCASKER,
THOMAS J. CARSON.

Copies of this patent may be obtained for five cents each, by addressing the "Commissioner of Patents, Washington, D. C."